United States Patent
Al-Amin et al.

(10) Patent No.: US 6,176,249 B1
(45) Date of Patent: Jan. 23, 2001

(54) INFLATOR

(75) Inventors: Ahmad K. Al-Amin, Higley; Jerome W. Emery, Gilbert; Guy M. Jackman, Chandler; Darrin L. Johnson, Fountain Hills; Scott R. Peavy, Gilbert; Barry F. Shaffer, Mesa, all of AZ (US)

(73) Assignee: TRW Inc., Lyndhurst, OH (US)

( * ) Notice: Under 35 U.S.C. 154(b), the term of this patent shall be extended for 0 days.

(21) Appl. No.: 09/371,777

(22) Filed: Aug. 10, 1999

(51) Int. Cl.$^7$ .................................................. F16K 17/40
(52) U.S. Cl. ..................... 137/68.19; 137/69; 137/68.13; 280/737
(58) Field of Search .................. 137/68.13, 68.19, 137/68.3, 69

(56) References Cited

U.S. PATENT DOCUMENTS

| 1,781,027 | * | 11/1930 | Mapes ................................. 137/68.3 |
| 3,836,170 | | 9/1974 | Grosch et al. . |
| 5,226,561 | | 7/1993 | Hamilton et al. . |
| 5,345,876 | * | 9/1994 | Rose et al. ........................... 280/737 |
| 5,584,505 | * | 12/1996 | O'Loughlin et al. ................ 280/737 |

FOREIGN PATENT DOCUMENTS

WO 97/08021  *  3/1997  (WO).

* cited by examiner

*Primary Examiner*—Gregory L. Huson
*Assistant Examiner*—Ramesh Krishnamurthy
(74) *Attorney, Agent, or Firm*—Tarolli, Sundheim, Covell, Tummino & Szabo L.L.P.

(57) ABSTRACT

An inflator (10) for providing inflation fluid to inflate an inflatable vehicle occupant protection device includes a pressure vessel (12) defining a chamber (30) for inflation fluid. The pressure vessel (12) has a passage (40) through which inflation fluid flows from the chamber (30). A burst disk (52) blocks fluid flow through the passage (40). A member (80) is disposed adjacent to and on one side of the burst disk (52) prior to the inflation fluid entering the pressure vessel (12). The burst disk (52) deforms toward the one side due to the pressure of the inflation fluid when the inflation fluid is disposed in the chamber (30). The member (80) limits deformation of the burst disk (52) by contacting the burst disk. An actuatable igniter assembly (66), when actuated, moves the member toward the burst disk (52) to rupture the burst disk and enable the inflation fluid to flow from the chamber (30) through the passage (40).

6 Claims, 3 Drawing Sheets

INFLATOR

FIELD OF THE INVENTION

The present invention relates to an inflator which provides inflation fluid to inflate an inflatable vehicle occupant protection device.

BACKGROUND OF THE INVENTION

An inflatable vehicle occupant protection device, such as a side curtain or an air bag, is inflated upon the occurrence of a vehicle condition requiring inflation of the side curtain or air bag. When inflation is required, an inflator is actuated to provide inflation fluid, which inflates the side curtain or air bag into the vehicle occupant compartment.

The inflator includes a pressure vessel defining a chamber with a passage through which inflation fluid flows from the chamber. A rupturable burst disk is fixed to the container to block fluid flow through the passage. The inflator further includes an electrically actuatable igniter assembly, which, when actuated, ruptures the burst disk to enable fluid to flow from the chamber through the passage.

SUMMARY OF THE INVENTION

The present invention is an inflator for providing inflation fluid to inflate an inflatable vehicle occupant protection device. The inflator includes a pressure vessel defining a chamber for inflation fluid. The pressure vessel has a passage through which inflation fluid flows from the chamber. A burst disk blocks fluid flow through the passage.

A member is disposed adjacent to and on one side of the burst disk prior to the inflation fluid entering the pressure vessel. The burst disk deforms toward the one side due to the pressure of the inflation fluid when the inflation fluid is disposed in the chamber. The member limits deformation of the burst disk by contacting the burst disk. An actuatable igniter assembly, when actuated, moves the member toward the burst disk to rupture the burst disk and enable the inflation fluid to flow from the chamber through the passage.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF A PREFERRED EMBODIMENT

Figure 1:
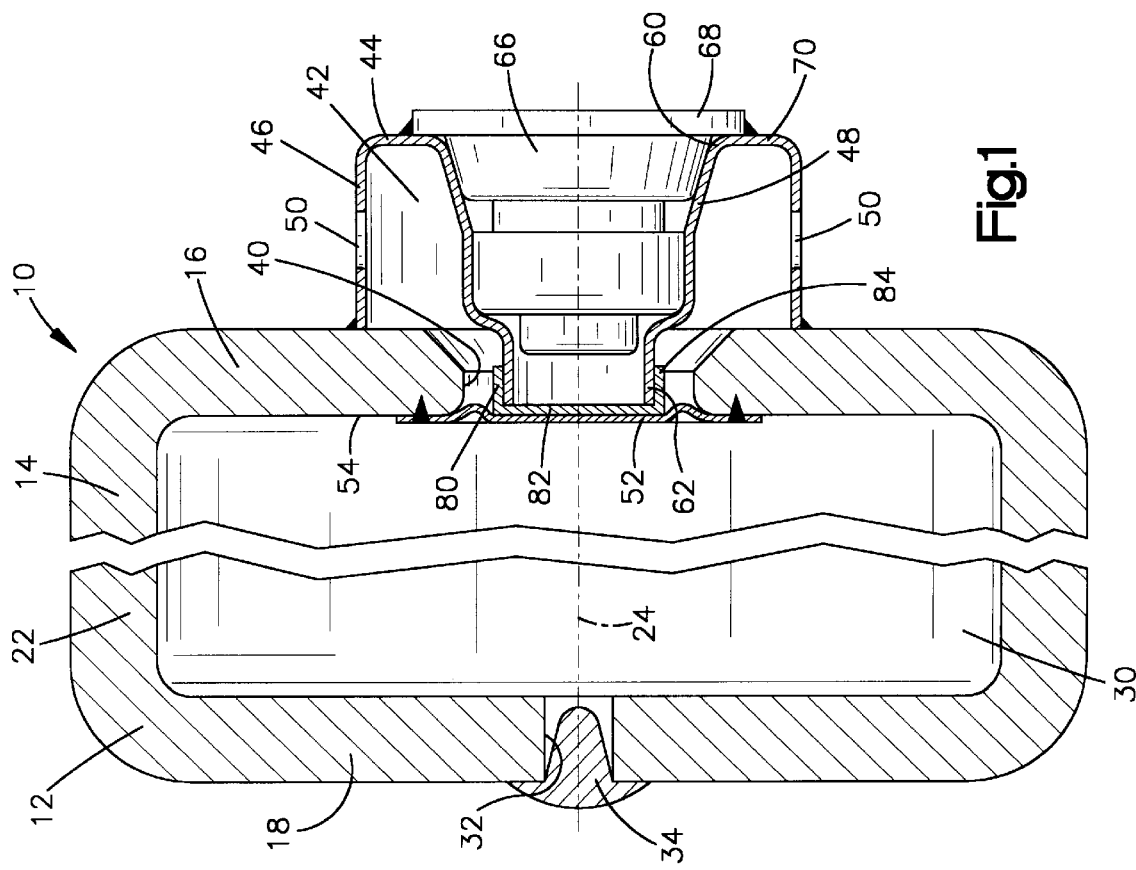
FIG. 1 is a schematic sectional view of an inflator of the present invention.

The present invention relates to an inflator which provides inflation fluid to inflate an inflatable vehicle occupant protection device, such as a side curtain, air bag, inflatable seat belt, inflatable knee bolster, inflatable air bag to operate a knee bolster, or inflatable head liner. As representative of the present invention, FIG. 1 illustrates schematically an inflator 10, which provides inflation fluid to inflate an inflatable vehicle occupant protection device (not shown).

The inflator 10 (FIG. 1) includes a pressure vessel 12 having a generally elongate configuration including a main body portion 14 and axially opposite end walls 16 and 18. The main body portion 14 of the pressure vessel 12 has a cylindrical configuration including an axially extending cylindrical side wall 22. The side wall 22 is centered on a longitudinal central axis 24 of the inflator 10.

The side wall 22 and end walls 16 and 18 define a chamber 30 in the pressure vessel 12. The chamber 30 contains pressurized inflation fluid. The inflation fluid stored in the chamber 30 preferably consists essentially of helium at a storage pressure within the range of about 4,000 psi to about 7,000 psi. The inflation fluid may, however, have any other composition and storage pressure suitable for inflating the inflatable vehicle occupant protection device.

The end wall 18 has an opening 32 (FIG. 2) through which inflation fluid flows to fill the pressure vessel 12 with inflation fluid. A closure member 34 (FIG. 1) closes the opening 32 after the inflator 10 has been filled with inflation fluid.

A passage 40 (FIG. 1) extends axially through the end wall 16 of the pressure vessel 12. The passage 40 is centered on the axis 24. The passage 40 conducts inflation fluid from the chamber 30 to a chamber 42 partially defined by a diffuser 44.

The diffuser 44 includes an axially extending cylindrical outer wall portion 46 and a central tubular support portion 48 spaced from the outer wall portion. The outer wall portion 46 is connected with the end wall 16 of the pressure vessel 12 by friction welding. The diffuser 44 could, however, be connected to the end wall 16 in any manner known in the art, such as using laser welds, brazing, or screw threads.

An annular array of inflation fluid outlet passages 50 is formed in the outer wall portion 46 of the diffuser 44. The outlet passages 50 direct inflation fluid from the chamber 42 to the inflatable vehicle occupant protection device.

A rupturable burst disk 52 is affixed to a surface 54 of the end wall 16 by a laser weld. The burst disk 52 could, however, be connected to the surface 54 in any manner well known in the art, such as by brazing, projection welding, or electron beam welding. The burst disk 52 is centered on the axis 24 and blocks the flow of inflation fluid through the passage 40 and to the chamber 42.

The central tubular support portion 48 of the diffuser 44 has an open axial end 60 spaced from the end wall 16. The tubular support portion 48 has another open axial end 62 located within the opening 40. The tubular support portion 48 is centered on the axis 24 and, therefore, is coaxial with the burst disk 52.

An igniter assembly 66 (FIG. 1) is housed in the tubular support portion 48. The igniter assembly 66 has a flange 68, which is connected to an axial end surface 70 of the diffuser 44. The flange 68 is connected to the end surface 70 in any manner well known in the art, such as by welding. The igniter assembly 66, when actuated, causes the burst disk 52 to rupture to enable fluid flow from the chamber 30.

A cup-shaped member 80 extends over the open end 62 of the tubular support portion 48. The member 80 is centered on the axis 24 and, therefore, is coaxial with the burst disk 52. The member 80 has a base 82 extending transverse to the axis 24. An annular flange 84 extends axially from the base 82 and along the end 62 of the tubular support portion 46. The base 82 engages the burst disk 52 when the inflation fluid is disposed in the chamber 30.

Figure 2:
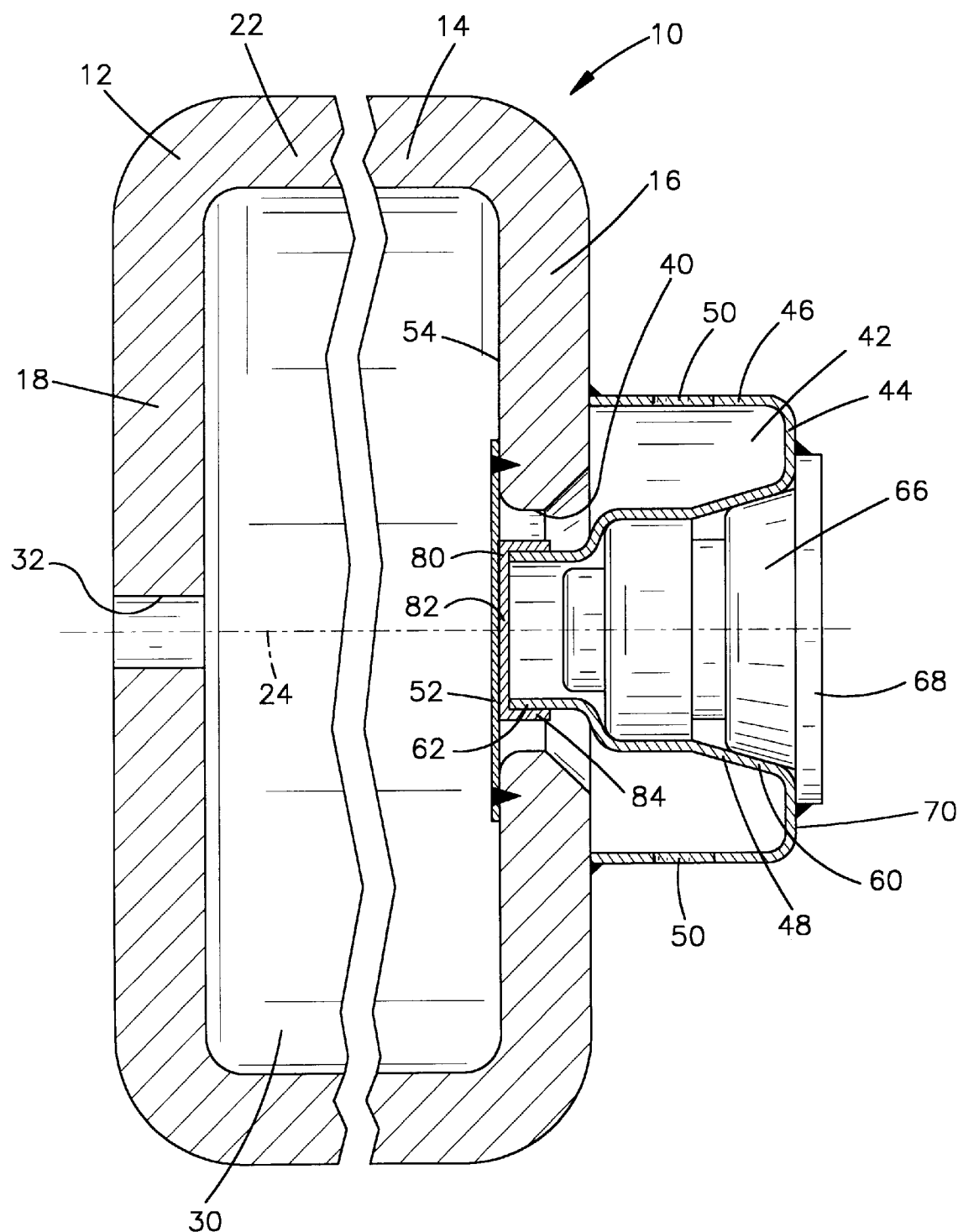
FIG. 2 is a view similar to FIG. 1 showing the inflator prior to inflation fluid entering the inflator.

When the chamber 30 is not filled with inflation fluid, as shown in FIG. 2, the burst disk 52 is a flat disk. The base 82 of the member 80 is disposed adjacent to and on a side of the burst disk 52 facing toward the diffuser 44. During the subsequent loading of the burst disk 52 by the pressure of the inflation fluid, the burst disk is stressed and undergoes plastic deformation around the base 82 of the member 80, as shown in FIG. 1. Accordingly, the member 80 limits the deformation of the burst disk 52. The burst disk 52 deforms from the flat disk shown in FIG. 2 into the shape shown in FIG. 1.

Alternatively, the base 82 of the member 80 could be disposed adjacent to and spaced apart from the burst disk 52 prior to filling the chamber 80 with inflation fluid. The burst disk 52 would deform into engagement with the base 82 due to the pressure of the inflation fluid entering the chamber 30.

Upon receiving an electrical signal from a sensor (not shown), the igniter assembly 66 is actuated in a known manner to produce combustion gas. The pressure of the combustion gas acts on the member 80 to move the member 80 axially toward the burst disk 52 from the position shown in FIG. 1 to the position shown in FIG. 3. As the member 80 moves from the position shown in FIG. 1 to the position in FIG. 3, the member ruptures the burst disk 52.

After the member 80 ruptures the burst disk 52, the fluid flow through the passage 40 acts on the member 80. The member 80 moves from the position shown in FIG. 3 to the position shown in FIG. 4. The member 80 remains on the end 62 of the tubular support portion 48 after the burst disk 52 ruptures. Accordingly, the member 80 does not interfere with the fluid flow to the outlet passages 50.

Figure 3:
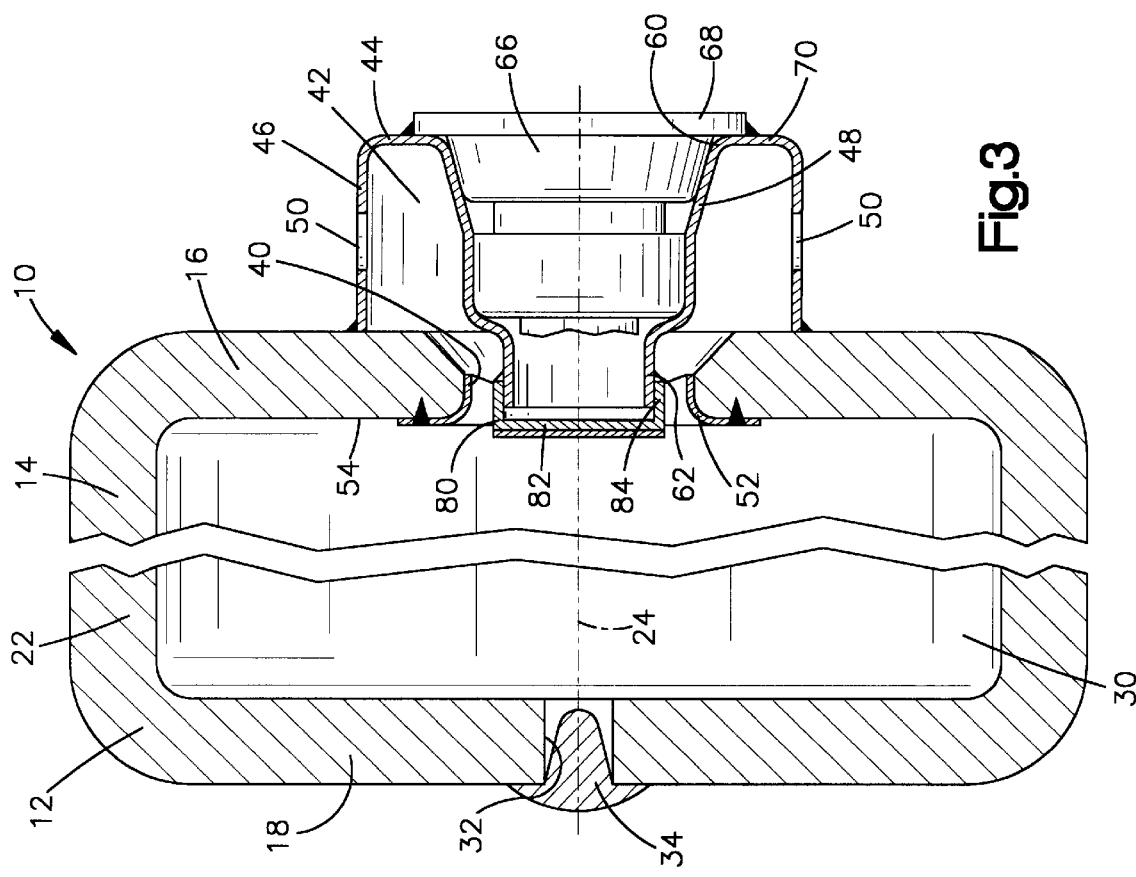
FIG. 3 is a view similar to FIG. 1 showing the inflator after an igniter assembly of the inflator has been actuated.

The member 80 ruptures the burst disk 52, as shown in FIG. 3, and enables fluid to flow from the chamber 30 through the passage 40. Fluid flows through the passage 40 and into the chamber 42. Fluid flows from the chamber 42 through the outlet passages 50 to the inflatable occupant protection device (not shown).

Figure 4:
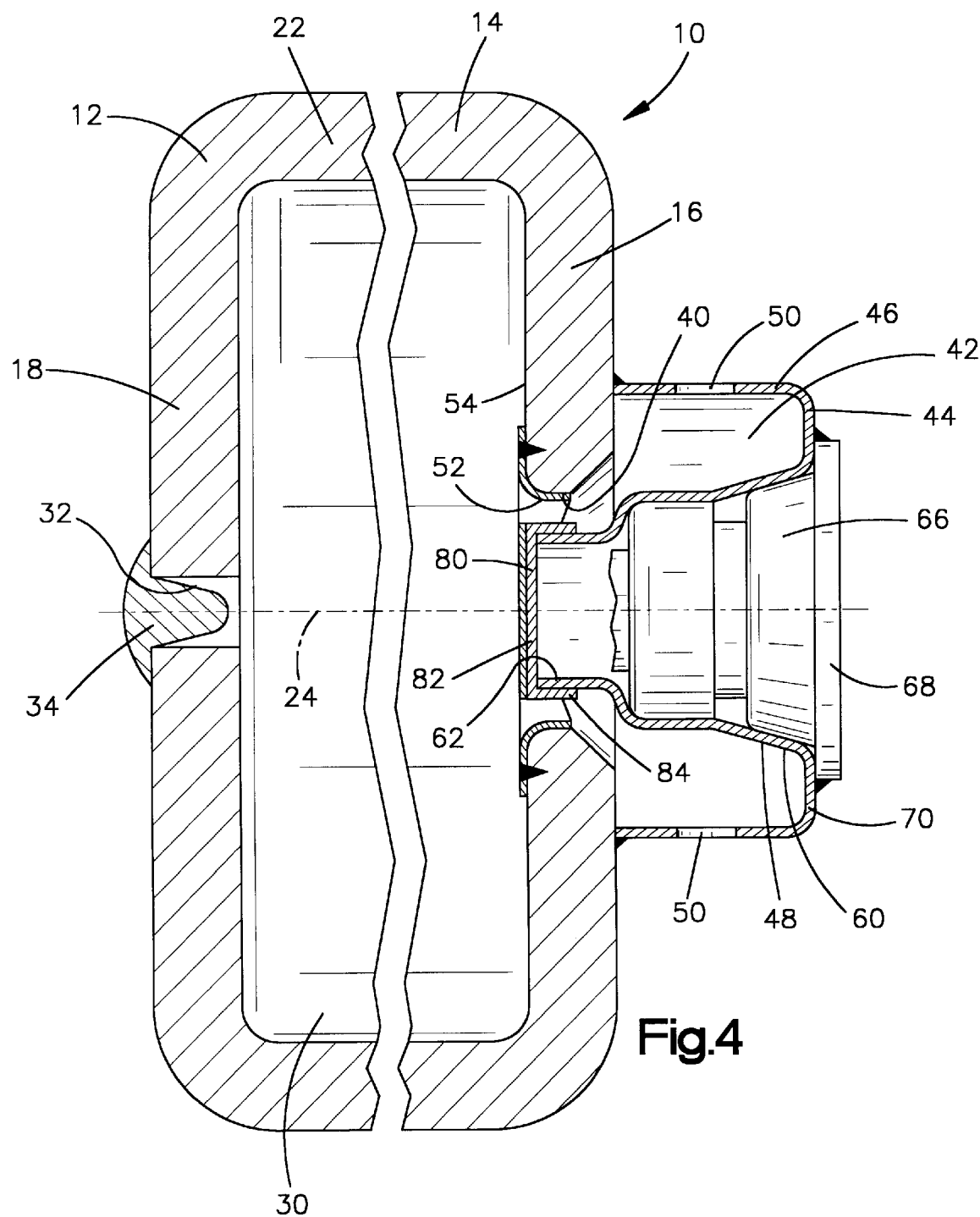
FIG. 4 is a view similar to FIG. 3 showing the inflator after a burst disk of the inflator has been ruptured.

As the inflation fluid flows through the passage 40 to the outlet passages 50, the inflation fluid moves the member 80 from the position shown in FIG. 3 to the position shown in FIG. 4. Accordingly, the member 80 does not block fluid flow through the passage 40 after the burst disk 52 has been ruptured.

From the above description of the invention, those skilled in the art will perceive improvements, changes and modifications. Such improvements, changes and modifications within the skill of the art are intended to be covered by the appended claims.

Having described the invention, the following is claimed:

1. An inflator for providing inflation fluid to inflate an inflatable vehicle occupant protection device, said inflator comprising:

a pressure vessel defining a first chamber for inflation fluid, said pressure vessel having a passage through which inflation fluid flows from said first chamber;

a burst disk blocking fluid flow through said passage;

a member disposed adjacent to and on one side of said burst disk prior to said inflation fluid entering said pressure vessel, said burst disk deforming toward said one side due to the pressure of said inflation fluid when said inflation fluid is disposed in said first chamber, said member engaging said burst disk and limiting deformation of said burst disk by contacting said burst disk;

an actuatable igniter assembly which, when actuated, moves said member toward said burst disk to rupture said burst disk and enable said inflation fluid to flow from said first chamber through said passage; and a diffuser having a second chamber for receiving inflation fluid flow from said passage, said diffuser having a central support portion for supporting said member, said member being movable relative to said central support portion, said central support portion being tubular and having first and second opposite open ends, said central support portion being coaxial with said burst disk;

said diffuser further having an outer wall portion spaced from said central support portion, said outer wall portion having outlet passages for directing inflation fluid from said second chamber to said inflatable vehicle occupant protection device;

said member having a cup shape with a base which engages said burst disk and an annular flange extending from said base along a part of said central support portion.

2. An inflator for providing inflation fluid to inflate an inflatable vehicle occupant protection device, said inflator comprising:

a pressure vessel defining a first chamber for inflation fluid, said pressure vessel having a passage through which inflation fluid flows from said first chamber;

a burst disk blocking fluid flow through said passage;

a member disposed adjacent to and on one side of said burst disk prior to said inflation fluid entering said pressure vessel, said burst disk deforming toward said one side due to the pressure of said inflation fluid when said inflation fluid is disposed in said first chamber, said member engaging a central region of said burst disk and limiting deformation of said burst disk by supporting said central region of said burst disk; and an actuatable igniter assembly which, when actuated, moves said member toward said burst disk to rupture said burst disk and enable said inflation fluid to flow from said first chamber through said passage.

3. An inflator as defined in claim 2 further including a diffuser having a second chamber for receiving inflation fluid flow from said passage.

4. An inflator as defined in claim 3 wherein said diffuser has a central support portion for supporting said member, said member being movable relative to said central support portion, said diffuser having an outer wall portion spaced from said central support portion, said outer wall portion having outlet passages for directing inflation fluid from said second chamber to said inflatable vehicle occupant protection device.

5. An inflator as defined in claim 4 wherein said central support portion is tubular and has first and second opposite open ends, said central support portion being coaxial with said burst disk.

6. An inflator as defined in claim 5 wherein said actuatable igniter is coaxial with said burst disk and located within said tubular central support portion.

* * * * *